J. O. LIFFLANDER.
DIVIDING APPARATUS.
APPLICATION FILED JULY 26, 1915.
1,206,006.
Patented Nov. 28, 1916.
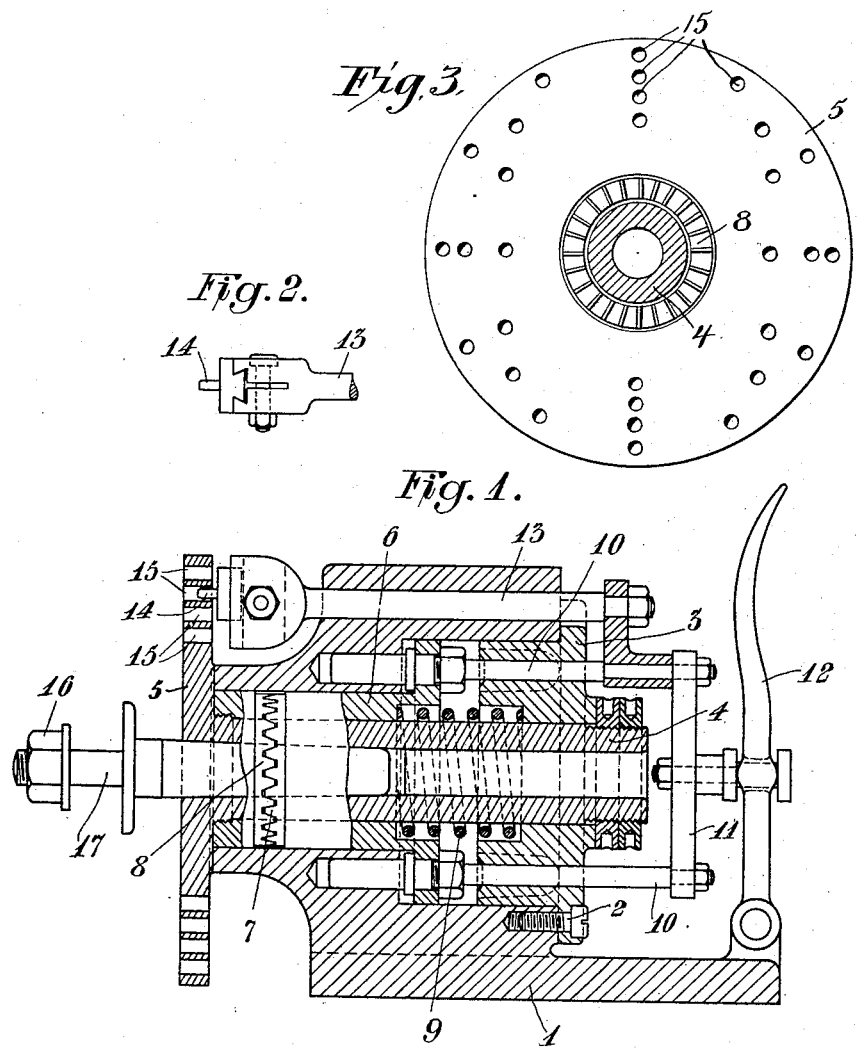

UNITED STATES PATENT OFFICE.

JOHAN OSCAR LIFFLANDER, OF STOCKHOLM, SWEDEN, ASSIGNOR TO J. & C. G. BOLINDERS MEKANISKA VERKSTADS AKTIEBOLAG, OF STOCKHOLM, SWEDEN.

DIVIDING APPARATUS.

1,206,006.      Specification of Letters Patent.      Patented Nov. 28, 1916.

Application filed July 26, 1915. Serial No. 42,100.

*To all whom it may concern:*

Be it known that I, JOHAN OSCAR LIFFLANDER, a subject of the King of Sweden, residing at Stockholm, in the Kingdom of Sweden, have invented a new and useful Improvement in Dividing Apparatus, of which the following is a specification.

When making tools, such as for instance cutters, reamers, and saws, or machine parts such as gear wheels and ratchet wheels, it is important that the pitch or division becomes perfectly equal between all of the teeth of the tool or the machine parts, and in case of tools which must be reground very often, as for instance cutters, it is especially important that the pitch is correct from the beginning, or else a very small initial error of division will easily be increased every time the tool is reground. The division apparatus actually used for this purpose usually consists of a rotatable disk provided with a number of holes or notches equally spaced on the circumference and engaged by a ratchet or a stud as the disk is moved step by step according to the pitch desired in each particular case. If such a dividing apparatus is mostly used for one certain pitch, however, the notches or holes in the disk corresponding to this pitch or division will, of course, become more worn than the other notches or holes, and if later on the disk is used for another pitch with which one or several of the worn notches or holes must also be used, the clearance or lost motion in the worn places will easily cause a corresponding defect in the work-piece, and such defects can only be avoided by particular attention and skill of the operator. This disadvantage is eliminated by this invention according to which the pitch or the division will be perfectly equal without special attention.

The invention is broadly characterized in that the spindle for securing the work-piece and which also carries the said dividing disk, is provided with a clutch or jaw coupling or similar coupling, which is adapted for all the different pitches or divisions, the number of teeth in each member of the coupling being a multiple of the number of holes in each series of holes.

Provided that the coupling is correctly made in regard to the division or pitch between its teeth or jaws and the shape of the same, as well as in regard to the setting device coacting with the coupling, the coupling must always insure, for each setting, a perfectly correct position of the spindle carrying the work-piece. As all teeth or jaws of the coupling are operative for every setting, they will always be equally worn, and the engagement of the members of the coupling will thus be equal irrespective of the pitch or division, consequently no defect can occur due to lost motion or the like.

The accompanying drawing illustrates an embodiment of the invention by way of example.

Figure 1 shows a vertical longitudinal section of the apparatus, and Fig. 2 shows a detail. Fig. 3 shows an inner face view of the disk and of one member of the jaw coupling.

The apparatus shown in the drawing consists of a frame 1 in which a bushing 3 is secured by means of bolts 2. In this bushing one end of the hollow spindle 4 is journaled, the other end of which is flanged to a disk 5 forming a part of the setting device above related to. A sleeve 6 is movable forward and backward on the spindle 4, but it is not rotatable in the frame. One end of this sleeve forms one member 7 of a jaw coupling 7, 8 the other member 8 of which is secured to the spindle 4. The spring 9 encircles the spindle between the sleeve 6 and the bushing 3. Rods 10 are secured to the sleeve 6 and project through and are guided by the stationary bushing 3. The rods are connected outside this bushing by means of a cross-piece 11 connected with the lever 12. A rod 13 guided in the frame 1 is secured to one of the rods 10, and this rod 13 is provided with an adjustable stud 14 at the end directed toward the setting disk 5. The stud may be adjusted to enter holes 15 in the disk 5, which holes are arranged preferably along a plurality of concentric circles the number of holes on each circle being different and corresponding to the desired angular positions of the spindle. The inside circle may for instance be provided with 4 holes, the next with 6 holes, and so on, all holes being equally spaced over the periphery of each circle. As shown in Fig. 3 the disk 5 is provided with four circles of 4, 6, 8, and 12 holes, respectively, the jaw coupling member 8 having 24 teeth.

The work-piece may be connected to the spindle 4 in different suitable manners. It may for instance be secured by means of a nut 16 to the spindle 17, which is thrust into the hollow spindle 4.

The apparatus is used in the following manner: The stud 14 is adjusted in the rod 13 in the position corresponding to the division desired, that is, directly opposite the one of the concentric circles in the disk 5 provided with the corresponding number of holes. When the work-piece is to be moved one step, the lever 12 is swung to the right in the drawing. The coupling member 7 is then moved out of engagement with the coupling member 8, and the stud 14 out of engagement with the disk 5, so that the disk with the spindle 4 and the work-piece may be turned. When the disk has been turned one step, that is, when the stud 14 is again opposite or about opposite the next hole in the disk 5, the lever is released, and the spring 9 compressed by the previous movement of the lever moves the coupling member 7 into engagement with the coupling member 8, so that owing to the shape and construction of the jaws the coupling members move the spindle and secure the same in the correct position that corresponds to the division. The stud 14 is preferably of such length that it enters the hole 15 before the jaws of the coupling members enter in between each other.

The construction of the described apparatus may be altered in various respects within the scope of the appended claims.

I claim:

1. In a dividing apparatus, the combination of a frame, a spindle for rotatably supporting a work-piece in said frame, a member rotatable with said spindle and provided with different series of indications corresponding to different angular positions, each of said series having a different number of indications therein, a second member connected to the frame and arranged to coöperate with any of said series of indications to facilitate setting said spindle in the desired angular position, and a jaw coupling between the spindle and the frame the number of teeth in each member of which coupling is a multiple of the number of angular positions corresponding to each series, substantially as and for the purpose described.

2. In a dividing apparatus, the combination of a frame, a spindle for rotatably supporting a work-piece in said frame, a disk on said spindle provided with different series of indications corresponding to different angular positions, each of said series having a different number of indications therein, a member connected to the frame for indicating the position of the disk, a jaw coupling between the spindle and the frame the number of teeth in each member of which coupling is a multiple of the number of indications in the various series, one member of said coupling being secured to the spindle and the other being movable in the frame in the axial direction of the spindle and guided against rotation in the frame, means for guiding the movement of said second member, and a lever connected to said second member for moving the same into and out of engagement with the member secured to the spindle, substantially as and for the purpose described.

3. In a dividing apparatus, the combination of a frame, a spindle for rotatably supporting a work-piece in said frame, a disk on said spindle provided with different series of different numbers of holes arranged in concentric circles, a jaw coupling member secured to the spindle, a second jaw coupling member movable in the frame in the axial direction of the spindle and guided against rotation in the frame, the number of teeth of each of said jaw coupling members being a multiple of the number of holes in each circle, means for moving the second member into and out of engagement with the first-mentioned member, a rod sliding in the frame and rigidly connected with the movable jaw coupling member, and a stud in the end of said rod adjustable so as to enter the holes of one of the said circles, substantially as and for the purpose described.

JOHAN OSCAR LIFFLANDER.

Copies of this patent may be obtained for five cents each, by addressing the "Commissioner of Patents, Washington, D. C."